Aug. 3, 1965  A. D. GOETTL  3,198,460
MOTOR MOUNT
Filed Feb. 12, 1963  3 Sheets-Sheet 1
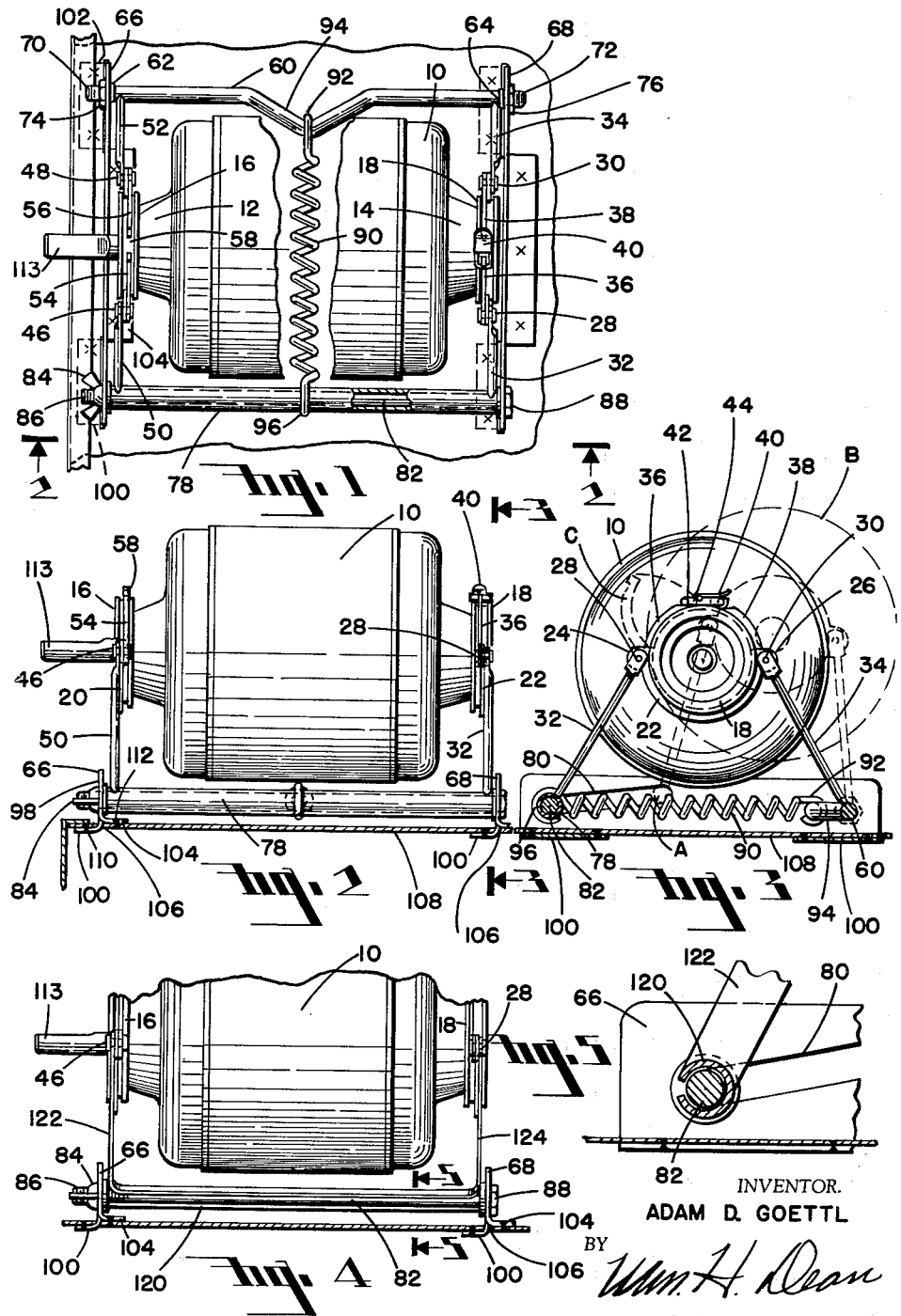
INVENTOR.
ADAM D. GOETTL
BY
*Wm. H. Dean*
PATENT AGENT

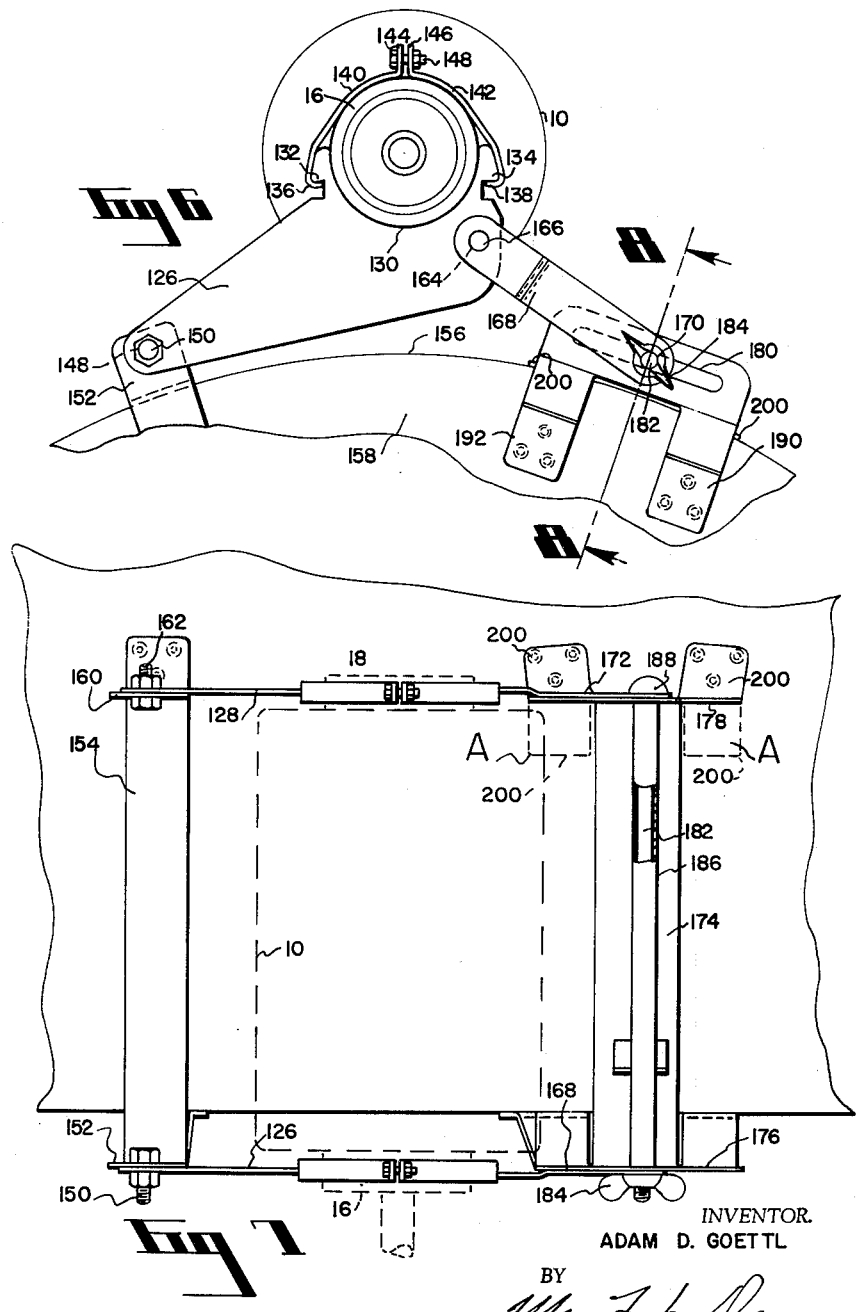

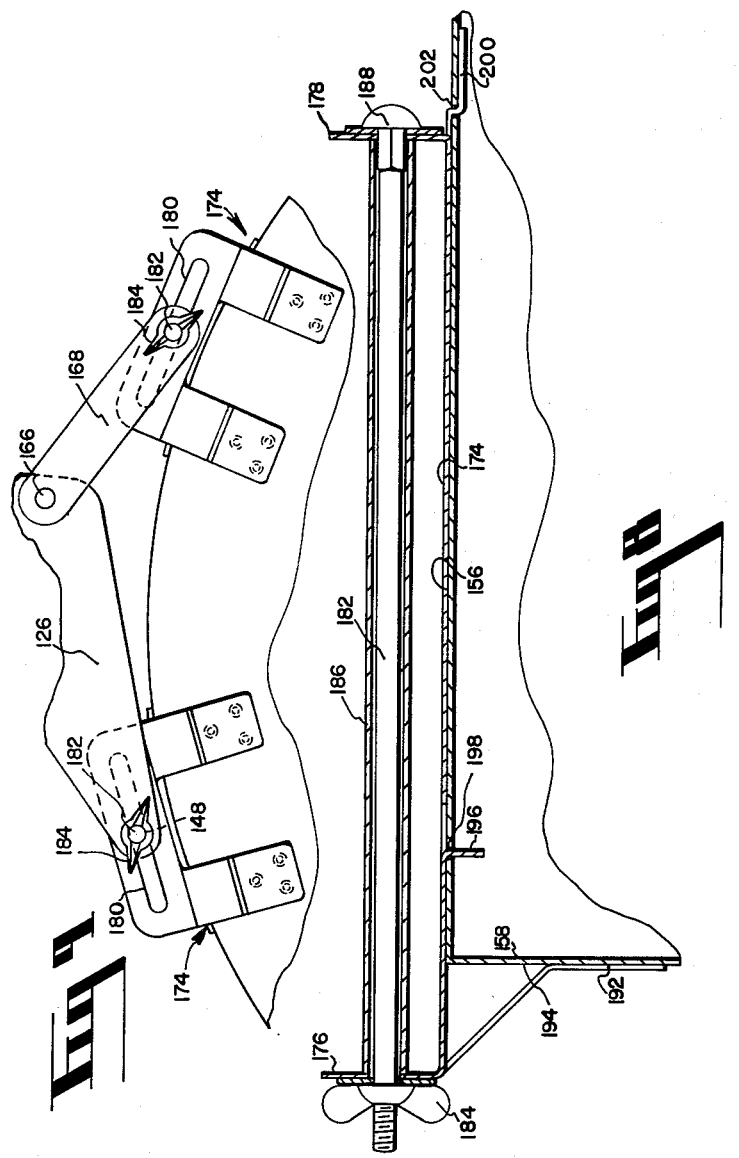

United States Patent Office 3,198,460
Patented Aug. 3, 1965

1

3,198,460
MOTOR MOUNT
Adam D. Goetti, 4960 Palomino Drive, Phoenix, Ariz.
Filed Feb. 12, 1963, Ser. No. 258,071
14 Claims. (Cl. 248—16)

The present application is a continuation in part of my co-pending application, Serial No. 81,733, for Motor Mount, filed January 10, 1961, now abandoned.

This invention relates to an adjustable motor mount and more particularly to an adjustable motor mount for mounting electric motors which are used to transmit power by means of a flexible belt.

The prior art includes various mounts for electric motors and most of them include conventional slotted bases wherein bolts are positioned so that the bolts may slide longitudinally in the slots and permit movement of the motor laterally of its axis in order to adjust the slack in a belt driven by the motor. Said bolts are so arranged that they may be tightened when the motor is moved to a desired position longitudinally of the slots whereby the bolts clamp the motor to the base.

These prior art motor mounts are difficult to operate since it is necessary to slide the entire motor laterally of its axis and hold it in place against tension of a belt connected with a pulley on the motor shaft while the base mount bolts are tightened. Usually there are four of these bolts which must be tightened and therefore the adjustment of a conventional electric motor mount requires considerable time and effort. Additionally, the adjustment of a conventional slotted base motor mount, with respect to tension of a belt on a pulley carried by the motor shaft, may not be made accurately and thus overtensioning or undertensioning of the belt is possible, depending upon the skill of the person adjusting the motor mount in order to obtain proper belt tension. Additionally, prior art motor mounts generally contain several parts comprising the usual clamps around the isolation and vibration damper sleeves, together with brackets connected to them which form a cradle which is slidably connected to a stationary base member usually coupled to or integral with an appliance on which the motor is to be used. The cradle and base may be manufactured separately but the dimensions of these separately manufactured parts must be carefully controlled in order that they will properly fit each other during assembly.

Accordingly, it is an object of the present invention to provide a motor mount for electric motors which is readily and easily adjustable to move the motor laterally of its axis so that proper adjustment of a belt, driven by the motor shaft, may be accomplished.

Another object of the invention is to provide resilient means in the motor mount which automatically moves the motor laterally of its axis when one screw is loosened whereby tension of the spring is sufficient to take up slack in a belt driven from the shaft of the motor and thereby applies proper tension to the belt.

Another object of the invention is to provide an adjustable motor mount wherein the loosening and tightening of a single thumb screw are the only operations necessary for the proper adjustment of a belt driven by a motor supported on said adjustable motor mount.

Another object of the invention is to provide a motor mount particularly adapted for electric motors wherein

2 a completely adjustable motor mount is combined with novel toggle clamp cradles which engage the isolation and vibration damper collars around the bearing ends of an electric motor.

Another object of the invention is to provide an adjustable motor mount wherein collars engage isolation and vibration damper rings on an electric motor and wherein separate pairs of struts are pivotally mounted on said collars; one pair of struts at one side of the axis of the motor being stationarily pivotally mounted on a base member while an opposite pair of struts at the opposite side of the axis of the electric motor are slidably mounted in a base structure whereby a spring interconnecting said pairs of struts may automatically force said struts together and move the electric motor laterally of its axis when carried in said collars.

Another object of the invention is to provide a very simple toggle clamp mechanism in the form of collars for receiving the isolation and vibration damper bushings of a conventional electric motor.

Another object of the invention is to provide a motor mount which includes a base, struts, and collars, all coupled together to form an adjustable motor mount which may be manufactured as a unitary mechanism and applied to various machines, as desired.

Another object of the invention is to provide an adjustable motor mount having novel means for coupling the base thereof to an article of sheet metal.

Further objects and advantages of the invention may be apparent from the following specification, appended claims, and accompanying drawings, in which:

FIG. 1 is a top or plan view of an adjustable motor mount, in accordance with the present invention, shown coupled to an article of sheet metal;

FIG. 2 is a side elevational view of the motor mount shown in FIG. 1 of the drawings;

FIG. 3 is a sectional view taken from the line 3—3 of FIG. 2;

FIG. 4 is a fragmentary side elevational view of a modified form of the motor mount of the invention;

FIG. 5 is an enlarged fragmentary sectional view taken from the line 5—5 of FIG. 4;

FIG. 6 is a view similar to FIG. 3 but illustrating a modification of the present invention;

FIG. 7 is a top or plan view of the structure shown in FIG. 6;

FIG. 8 is a sectional view taken from the line 8—8 of FIG. 6; and

FIG. 9 is a fragmentary side elevational view similar to FIG. 1 showing a further modification of the present invention.

As shown in FIGS. 1, 2, and 3, the motor mount of the invention is adapted to mount a conventional electric motor 10 having conventional opposed shaft bearing bosses 12 and 14 at its opposite ends.

Conventional resilient isolation and vibration damper bushings 16 and 18 surround the bearing bosses 12 and 14, respectively. These bushings and bosses are conventionally concentric with the axis of the motor 10.

The motor mount of the present invention is provided with a pair of semicircular collar sections 20 and 22 which partially surround the resilient bushings 16 and 18, respectively.

As shown in FIG. 3 of the drawings, the collar section 22 is substantially semicircular and provided with bearing tabs 24 and 26, through which pins 28 and 30, respectively, extend. Pivotally mounted on these pins 28 and 30 are struts 32 and 34. Also pivotally mounted on these pins 28 and 30 are arcuate collar sections 36 and 38.

Pivotally connected to the collar section 38 is a toggle clamp 40 having a bail 42 disposed to engage a notch 44 of the arcuate collar section 36 whereby the toggle clamp 40 may tightly connect the arcuate collar sections 36 and 38 for clamping the same securely around the resilient isolation and vibration damper bushing 18. Thus, this bushing 18 is held within the arcuate limits of the semicircular collar section 22 and the arcuate collar sections 36 and 38.

The arcuate collar section 20 is similar in construction to the collar section 22, hereinbefore described. Pivotally connected to the arcuate collar section 20 by means of pivot pins 46 and 48 are struts 50 and 52. Also, pivotally connected to the pins 46 and 48 are arcuate collar sections 54 and 56 similar to the hereinbefore described collar sections 36 and 38.

A toggle 58, similar to the toggle 40, interconnects the arcuate collar sections 54 and 56 which, together with the collar section 20, surrounds the isolation and vibration damping bushing 16.

The lower ends of the struts 34 and 52 are coupled to a bar 60 having shoulder portions 62 and 64 abutted to base members 66 and 68. The bar 60 is provided with threaded end portions 70 and 72 which are integral with an extend beyond the shoulders 62 and 64, respectively, and these threaded portions 70 and 72 extend through the base members 66 and 68 while nuts 74 and 76, on the threaded portions 70 and 72, are clamped against the opposite sides of the base members 66 and 68 from the respective shoulders 62 and 64.

The threaded portions 70 and 72 of the bar 60 extend through openings in the base members 66 and 68 maintaining a fixed pivotal axis for the bar 60.

The struts 32 and 50 are fixed by welding, or otherwise, to a tubular sleeve 78 having opposite ends abutted to the base members 66 and 68. Extending through slots 80 in the base members 66 and 68 and positioned in the sleeve 78 is a bolt 82. This bolt 82 is provided with a wing nut 84 engaging a threaded section 86 at one end and is provided with a head 88 on its opposite end. The head 88 abuts the outer side of the base member 68 while the wing nut 84 abuts the outer side of the base member 66.

The slots, as shown in FIG. 3 of the drawings, permit the bolt 82, together with the sleeve 78, to slide toward a broken line position A, shown in FIG. 3 of the drawings, so that the motor 10 may be moved to the broken line position B or to any intermediate position, as desired.

A spring 90 is provided with a hook end 92 engaging an offset portion 94 of the bar 60 while the opposite end of the spring is provided with a hook 96 engaging the hollow tubular member 78. This spring is a tension spring tending to force the hollow tubular member 78 toward the bar 60.

The base members 66 and 68 are formed of sheet metal and these base members are substantially identical in construction. The base member 66, as shown in FIGS. 1 and 2 of the drawings, is provided with an upstanding portion 98 and a pair of spaced tabs 100 and 102 extending at substantially right angles to the upstanding portion 98 while an intermediate tab 104 extends in the opposite direction at substantially right angles to the upstanding portion 98. It will be seen that the tabs 100 are spaced laterally of the intermediate tab 104 and that these tabs 100 may each be inserted through an opening 106 in a sheet metal part 108 which may be the housing of a blower or the like. These base members 66 and 68 may thus be held to the sheet metal element 108 or may be secured by spot welds 110 and 112 through the tabs 100 and 104, respectively. Since the base members 66 and 68 are identical, reference characters applied to the base 68, in FIG. 3, are the same as those applied to the base member 66, in FIG. 2.

Operation of the adjustable motor mount of the present invention is substantially as follows:

The base members 66 and 68 may be secured to the sheet metal member 108 by extending the tabs 100 through the slots 106 in the sheet metal member 108. Thus, the base members 66 and 68 are positioned on a blower housing, or the like, on which the motor 10 is to be mounted. The shaft 113 of the motor may carry a pulley for driving a belt and when it is desired to adjust the shaft 113 or move it laterally of its axis, the wing nut 84 may be screwthreadably loosened on the end 86 of the shaft 82, thereby permitting tension of the spring 90 to move the shaft 82, together with the hollow tubular member 78, laterally toward the broken line position B. This movement of the motor, by means of the spring 90, is in a direction to tighten a belt driven by a pulley on the motor shaft so that a person merely releases the wing nut 84 and permits the spring to move the motor laterally until slack in the belt is taken up, whereupon the wing nut is again tightened. As the wing nut is tightened, it clamps the hollow tubular member 78 between the base members 66 and 68, thereby securely fixing the position of the motor 10, as desired. It will be seen that the motor position may be anywhere between the solid line position and the broken line position B, shown in FIG. 3 of the drawings.

When the motor is placed in the mount of the present invention, the arcuate collar members 36 and 38 are in a broken line position C, as indicated in FIG. 3 of the drawings, permitting the motor, together with its isolation and vibration damper sleeves 16 and 18, to be located and cradled in the arcuate collar members 20 and 22, whereupon the toggles 40 and 58 are then tightened in overcenter position to lock the motor in place.

In the modification, as shown in FIGS. 4 and 5 of the drawings, a sleeve 120 is provided with struts 122 and 124 forming a structure alternate to the assembly of the hollow tubular sleeve 78 and the struts 32 and 50, disclosed in FIG. 2 of the drawings. It will be seen that the hollow tubular section 120 and struts 122 and 124 are integral and all formed of a common piece of sheet metal. This may facilitate the farbrication of the motor mount in accordance with the invention, however, the tubular portion 120 is the equivalent of the hollow tubular portion 78 and surrounds the bolt 82 in a similar manner. The bolt 82 slides in the slots 80, as hereinbefore described, in connection with the structure disclosed in FIGS. 1 to 3, inclusive, of the drawings.

In the modification, as shown in FIG. 6 of the drawings, the resilient bushings 16 and 18, hereinbefore described, are cradled, at their lower portions, in arms 126 and 128 which provide support for opposite ends of the electric motor 10.

Inasmuch as the arms 126 and 128 are substantially identical, the arm 126 will be described in detail.

This arm 126, as shown in FIG. 6 of the drawings, is preferably made of sheet metal, or the like, and is provided with an arcuate cradle recess 130 in which bushing 16 is mounted. At opposite sides of the recess 130 are clamp hook portions 132 and 134 which are integral with the arm 126. These hooks 132 and 134 are engaged by conforming hook portions 136 and 138 of clamp straps 140 and 142 which are clamped together at their normally upper end portions 144 and 146 by a bolt 148. Thus, the bushing 16 is substantially surrounded by the arcuate recess portion 130 and the clamp straps 140 and 142. Tension of the bolt 148 holds the hook portions 136 and 138 firmly in engagement with the hooks 132 and 134 of the arm 126.

The arm 126 is provided with an opening 148 through which a bolt 150 extends. This bolt 150 also extends through an upwardly extending tab portion 152 of a bracket 154 which is stationarily mounted on a surface 156 of a blower housing 158.

An opposite end of the bracket 154 is provided with an upwardly extending tab 160 through which a bolt 162 extends. This bolt also extends through the arm 128 in a manner similar to the extension of the bolt 150 through the arm 126, hereinbefore described.

Near the recess 130, the arm 126 is provided with an opening 164 in which a pin 166 is disposed. This pin 166 also extends through a link 168 having an opening 170 extending through its opposite end. A link 172 corresponding with the link 168 is similarly connected to the arm 128.

A second mounting bracket 174 is mounted on the blower housing 158 and is provided with upwardly extending tabs 176 and 178. These tabs are provided with slots 180 in which a bolt 182 is slidably mounted. This bolt 182 is provided with a wing nut 184 disposed to tighten the bolt while a tubular spacer 186, at its opposite ends abuts the inner sides of the tabs 176 and 178 of the bracket 174. Thus, permitting the bolt 182, at its head 188, to clamp against the link 172 while the wing nut 184 clamps against the link 168 thereby holding the respective links securely locked against the respective tabs 178 and 176.

Movement of the bolt 182 longiudinally of the slots 180 permits adjustment of the position of the motor about the axis of the bolts 150 and 162 to thereby adjust the motor axis relative to the axis of the blower in the housing 158.

It will be seen that the bracket 174, at its one end, is provided with a pair of blanked out tabs 190 and 192 which are spot welded, or otherwise secured, to a side 194 of the blower housing 158. The bracket 174 is also provided with a blanked out tab 196 which is formed downwardly and extended through a slot 198 in the upper surface 156 of the blower housing 158 to thereby lock the bracket 174 in position.

An opposite end of the bracket 174 adjacent the upwardly extending tab 178 is provided with a joggled end portion 200 which is fitted through a slotted portion 202 in the blower housing 158 so that initially, the bracket 174 is installed by inserting the joggled portion 200 through the slot 202 whereupon the bracket is subsequently pivoted downwardly until the tab 196 passes through the slotted portion 198 whereupon the tabs 190 and 192 are then spot welded, or secured by screws or bolts, to the side 194 of the blower housing 158.

It will be seen that the tabs 200 are initially formed in a broken line position A, as shown in FIG. 7 of the drawings, when the bracket 174 is blanked from a single piece of metal and then these tabs 200 are formed and bent into the opposite direction and joggled so that they assume the configuration shown in FIG. 8 of the drawings, wherein they are inserted in the slot 202 of the blower housing.

It will be appreciated that this construction provides a very simple means for securing the bracket 174 to the blower housing with a minimum amount of labor.

It will be seen that the tabs 200 may be secured by bolts or spot welding, if desired, such bolts or spot welding connecting the tabs 200 directly with the upper portion 156 of the blower housing 158.

As shown in FIG. 9 of the drawings, a pair of brackets 174 may be used to support a pair of bolts 182 in the slots 180, said bolts extending through the links 168 and also through the openings 148 in the arms 126 and 128. Thus, the bolt 182, having its spacer 186, is disposed between respective tabs of the bracket 174, as hereinbefore described, and thus permitting adjustment of the arms 126 relative to a slot 180 and one of the brackets 174 while permitting optional or concurrent adjustment of the links 168 and 172 relative to the slots 180 in the other bracket 174.

In operation, the modified structure, as shown in FIGS. 6 to 9, inclusive, of the drawings, the resilient mounts 16 and 18 of the electric motor 10 are held in the arms 126 and 128 and these arms may either be pivoted stationarily by the bolts 150 and 162 in the bracket 154 or they may be movably mounted in connection with slots 180 of a bracket 174, as shown in FIG. 9 of the drawings. The movement of the links 168 and 172 afforded by adjustment of the bolt 182 in the slot 180 of the bracket 174, shown in FIG. 7 of the drawings, permits pivotal adjustment of the motor 10 about the axes of the bolts 150 and 162 thereby adjusting the distance between the axis of the motor and the axis of the blower housing 158 so that respective pulleys and shafts may be adjusted relative to each other to accommodate belt stretch or initial belt installation over such pulleys so that the motor 10 may drive the impeller internally of the blower housing 158.

It will be appreciated by those skilled in the art that the bracket structures disclosed in the modifications of the present invention and the simple means for installing these brackets as well as for mounting the motor and adjusting its axis relative to the blower axis provides considerable facility, not only in the production and assembly of the motor mount relative to a blower housing, but also subsequent maintenance of the motor drive system and its supports.

It will be obvious to those skilled in the art that various modifications of the present invention may be resorted to in a manner limited only by a just interpretation of the following claims.

I claim:

1. In an adjustable motor mount the combination of: first means for supporting a motor and disposed concentric with its axis; first strut means pivotally connected thereto on an axis parallel to the axis of a motor supported thereby; base means pivotally mounting said first strut means; and second strut means having one end pivotally connected to said first means and having another end movable laterally of said first mentioned axis and supported on said base means.

2. In an adjustable motor mount the combination of: first means for supporting a motor and disposed concentric with its axis; first strut means pivotally connected thereto on an axis parallel to the axis of a motor supported thereby; base means pivotally mounting said first strut means; and second strut means having one end pivotally connected to said first means and having another end movable laterally of said first mentioned axis and supported on said base means; resilient means tending to cause slidable movement of said second strut means relative to said first strut means on said base.

3. In an adjustable motor mount the combination of: first means for supporting a motor and disposed concentric with its axis; first strut means pivotally connected thereto on an axis parallel to the axis of a motor supported thereby; base means pivotally mounting said first strut means; and second strut means having one end pivotally connected to said first means and having another end movable laterally of said first mentioned axis and supported on said base means; means for fixing said second mentioned strut on said base in various positions relative to the mounting of said first strut means on said base.

4. In an adjustable motor mount the combination of: first means for supporting a motor concentric with its axis; first strut means pivotally connected thereto on an axis parallel to the axis of a motor supported thereby; base means pivotally mounting said first strut means; second strut means pivotally connected to said first means and movably supported on said base means, said first means comprising arcuate sections pivotally connected together and disposed substantially to surround conventional isolator and vibration damper sleeves on said motor; and means for clamping said arcuate sections together therearound.

5. In an adjustable motor mount the combination of: first means for supporting a motor concentric with its axis; first strut means pivotally connected thereto on an axis parallel to the axis of a motor supported thereby; base means pivotally mounting said first strut means; second strut means pivotally connected to said first means and movably supported on said base means, said first means comprising arcuate sections pivotally connected together and disposed substantially to surround conventional isolator and vibration damper sleeves on said motor; and means for clamping said arcuate sections together therearound, said last mentioned means comprising toggle mechanism.

6. In an adjustable motor mount the combination of: a motor; isolation and vibration damper sleeves surrounding the axis of said motor near opposite ends thereof; first means surrounding and supporting said isolation and vibration damper sleeves; a first strut means pivotally connected to said first means; a base to which said first strut means is pivotally connected; a second strut means pivotally connected to said first means, said second strut means adjustably movable on said base toward and away from the pivotal connection of said first strut means therewith; and resilient means tending to force said second strut means toward said first strut means.

7. In an adjustable motor mount the combination of: a motor; isolation and vibration damper sleeves surrounding the axis of said motor near opposite ends thereof; first means surrounding and supporting said isolation and vibration damper sleeves; a first strut means pivotally connected to said first means; a base to which said first strut means is pivotally connected; a second strut means pivotally connected to said first means, said second strut means adjustably movable on said base toward and away from the pivotal connection of said first strut means therewith; resilient means tending to force said second strut means toward said first strut means; and further means for fixing said second strut means in position on said base.

8. In an adjustable motor mount the combination of: a motor; isolation and vibration damper sleeves surrounding the axis of said motor near opposite ends thereof; first means surrounding and supporting said isolation and vibration sleeves; a first strut means pivotally connected to said first means; a base to which said first strut means is pivotally connected; a second strut means pivotally connected to said first means, said second strut means adjustably movable on said base toward and away from the pivotal connection of said first strut means therewith; and resilient means tending to force said second strut means toward said first strut means, said first means comprising a plurality of pivoted arcuate sections; and further means for clamping said arcuate sections together.

9. In an adjustable motor mount the combination of: a motor; isolation and vibration damper sleeves surrounding the axis of said motor near opposite ends thereof; first means surrounding and supporting said isolation and vibration damper sleeves; a first strut means pivotally connected to said first means; a base to which said first strut means is pivotally connected; a second strut means pivotally connected to said first means, said second strut means adjustably movable on said base toward and away from the pivotal connection of said first strut means therewith; resilient means tending to force said second strut means toward said first strut means, said first means comprising a plurality of pivoted arcuate sections; and toggle mechanism for clamping said arcuate sections together.

10. In an adjustable motor mount the combination of: an electric motor having resilient bushings on opposite ends thereof concentric with its axis; clamp means secured around said resilient bushings; mount bracket means disposed to be secured onto a stationary object; said clamp means, at each opposite end of said motor, individually pivotally connected to said mount bracket; link means pivotally connected to each of said clamp means at opposite ends of said motor; said mount bracket means having slotted portions therein; and a single bolt extending through said slotted portions and said link means at opposite ends of said motor; and means for tightening and fixing said link means in various adjusted positions longitudinally of said slotted portions.

11. In a mount for electric motors, the combination of: an electric motor and resilient mount bushings on opposite ends thereof; clamp means connected with said resilient bushings; a motor mounting bracket disposed to be secured to a stationary object; said clamp means pivotally connected to said motor mount bracket; said motor mount bracket having a pair of slotted tabs; a bolt extending through said slotted tabs and movable longitudinally of the slots therein; links mounted on said bolt and having opposite ends pivotally connected to said clamp means at opposite ends of said motor, there being an individual link connected to each of said clamp means at opposite ends of said motor; said individual link operating adjacent one of said tabs of said motor mount bracket; a common bolt extending through said links and said slotted portions; and a spacer surrounding said bolt and disposed between said tabs and links at opposite ends of said motor; and single tightening means for said bolt for clamping said tabs and said links together to hold said bolt and said links securely in juxtaposition with relation to said tabs at various adjusted positions of said bolt longitudinally of said slotted portions.

12. In an adjustable mount for electric motors, the combination of: a mount bracket having a pair of spaced upwardly extending tabs; arms pivotally connected to said tabs and spaced a distance sufficiently to substantially align with resilient bushings at opposite ends of an electric motor; said arms having arcuate portions for cradling and holding said resilient bushings; clamp means on said arms for clamping said bushings into said arcuate recess means; links pivotally mounted to said arms at opposite ends of said motor; opposite ends of said links connected to a common bolt; a second bracket portion having a pair of tabs provided with slots therein in which the bolt is movably mounted; a spacer on said bolt between said tabs; and tightening means for said bolt for clamping said links adjacent said tabs for fixing said links in certain adjusted positions longitudinally of said slotted portions and relative to said tabs for holding said arms and the axis of said motor in certain juxtaposition and adjusted relationship with relation to said motor mount bracket.

13. In an adjustable motor mount the combination of: an electric motor having resilient bushings on opposite ends thereof concentric with its axis; clamp means secured around said resilient bushings; mount bracket means disposed to be secured onto a stationary object; said clamp means, at each opposite end of said motor, individually pivotally connected to said mount bracket; link means pivotally connected to each of said clamp means at opposite ends of said motor; said mount bracket means having slotted portions therein; and a single bolt extending through said slotted portions and said link means at opposite ends of said motor; and means for tightening and fixing said link means in various adjusted positions longitudinally of said slotted portions; said stationary object being the housing of a blower; a joggled portion at one end of said mount bracket means; a slotted portion in said housing through which said joggle portion is extended and interlocked; and tab means near opposite ends of said mount bracket means fixed to said blower housing.

14. In an adjustable motor mount the combination of: an electric motor having resilient bushings on opposite ends thereof concentric with its axis; clamp means secured around said resilient bushings; mount bracket means disposed to be secured onto a stationary object; said clamp means, at each opposite end of said motor, individually pivotally connected to said mount bracket; link means pivotally connected to each of said clamp means at opposite ends of said motor; said mount bracket means having slotted portions therein; and a single bolt extending through said slotted portions and said link means at opposite ends of said motor; and means for tightening and fixing said link means in various adjusted positions longitudinally of said slotted portions; said stationary object being the housing of a blower; a joggled portion at one end of said mount bracket means; a slotted portion in said housing through which said joggle portion is extended and interlocked; and tab means near opposite ends of said mount bracket means fixed to said blower housing; said last mentioned tab means fixed to one substantially vertical side of said blower housing; said joggled portion extending through said slotted portion of said blower housing on a substantially horizontal portion thereof.

References Cited by the Examiner

UNITED STATES PATENTS

| | | | |
|---|---|---|---|
| 1,632,261 | 6/27 | Woodrow | 248—23 |
| 3,003,732 | 10/61 | Sand | 248—223 |

CLAUDE A. LE ROY, *Primary Examiner.*